United States Patent [19]

Pollak et al.

[11] Patent Number: 4,809,473
[45] Date of Patent: Mar. 7, 1989

[54] INSTALLATION MEMBER FOR LEAD GUIDANCE CHANNELS

[75] Inventors: Gottfried Pollak, Waldfischbach-Burgalben; Günther Müller, Illerrieden, both of Fed. Rep. of Germany

[73] Assignee: Tehalit Kunststoffwerk GmbH, Heltersberg, Fed. Rep. of Germany

[21] Appl. No.: 34,107

[22] Filed: Apr. 2, 1987

[30] Foreign Application Priority Data

Apr. 8, 1986 [DE] Fed. Rep. of Germany ....... 8609417

[51] Int. Cl.$^4$ .............................................. H02G 3/04
[52] U.S. Cl. .................................... 32/220; 52/221; 174/48; 292/49
[58] Field of Search ................ 52/220, 221, 127.5, 52/127.6, 127.7, 127.9, 127.12; 174/48, 49, 50, 65 R, 57, 58, 65 SS, 65 G; 220/3.3, 3.5, 3.2, 3.4; 292/49, 51

[56] References Cited

U.S. PATENT DOCUMENTS

| 3,173,227 | 3/1965 | Clark | 52/221 X |
|---|---|---|---|
| 3,322,442 | 5/1967 | Flachbarth | 52/221 X |
| 3,911,635 | 10/1975 | Traupe | 52/221 |
| 4,264,779 | 4/1981 | Rhodes et al. | 174/48 |
| 4,341,919 | 7/1982 | Kohaut | 174/48 |

FOREIGN PATENT DOCUMENTS

| 1216957 | 5/1966 | Fed. Rep. of Germany. | |
|---|---|---|---|
| 1276153 | 8/1968 | Fed. Rep. of Germany. | |
| 7047743 | 8/1971 | Fed. Rep. of Germany. | |
| 2123958 | 11/1972 | Fed. Rep. of Germany. | |
| 2017232 | 11/1974 | Fed. Rep. of Germany. | |
| 2420017 | 11/1975 | Fed. Rep. of Germany | 174/48 |
| 7711728 | 8/1980 | Fed. Rep. of Germany. | |
| 7728102 | 8/1980 | Fed. Rep. of Germany. | |
| 3305602 | 8/1984 | Fed. Rep. of Germany. | |
| 389053 | 6/1965 | Switzerland | 174/48 |
| 403905 | 6/1966 | Switzerland | 52/221 |

Primary Examiner—Carl D. Friedman
Assistant Examiner—Richard E. Chilcot, Jr.
Attorney, Agent, or Firm—Toren, McGeady & Associates

[57] ABSTRACT

An installation member for service ducts includes a control disk (2) with rotating shaft (16) which is rotatably mounted in a housing (1). Screw thread-type trip cams (3) are formed in the outer side of control disk (2). Two Z-shaped clamping levers (4) are placed in a central longitudinal slot in the bottom of housing (1). The upper arms (6) of the clamping levers (4) each engage in one of the trip cams (3), wherein a bent portion (8) at the end of the arm and a ramp (17) at the trip cam (3) facilitates the conversion of the rotating movement into a tilting movement. The lower arms (5) of the clamping levers (4) engage in one of the longitudinal grooves (19) having an approximately T-shaped cross-section provided on the rear wall (25) of the ducts.

5 Claims, 1 Drawing Sheet

INSTALLATION MEMBER FOR LEAD GUIDANCE CHANNELS

BACKGROUND OF THE INVENTION

1. Field of the Invention

The invention relates to an installation member for service ducts whose rear walls are provided with longitudinal grooves having an essentially T-shaped cross-section. The installation member comprises an approximately rectangular bottom part with a central longitudinal slot into which an approximately Z-shaped clamping lever is placed in such a way that, in the assembled state, the arm of the lever on the top side of the bottom part is placed flat on this top side and the arm of the clamping lever on the bottom side of the bottom part engages in the groove and presses the installation member against the walls of the groove.

A large number of service ducts are known, for example, from German Offenlegungsschrift No. 21 23 958, German Auslegeschrift No. 12 16 957, German Auslegeschrift No. 12 76 153, German Auslegeschrift No. 20 17 232 or German Utility Model 77 11 728. These ducts are usually made of extruded, thermoplastic material, of extruded aluminum or profiled sheet steel. The open side of the duct may be covered with a cover. The ducts are mounted on ceilings, walls, under window railings, on laboratory tables etc.

2. Description of the Prior Art

Special installation members are required for fastening electrical installation devices, for example, sockets, switches, remote control receivers etc., in such ducts. Such installation members are described, for example, in German Utility Model Nos. 70 47 743 and 77 28 102. These installation members are boxes into which commercially available devices can be inserted. The box serving as installation member is fastened to the rear wall of the duct by means of a Z-shaped clamping element. This clamping element is inserted through a central slot in the bottom of the installation member in such a way that it engages the longitudinal groove of the duct and, in the assembled position when the inner arm of the clamping element rests against the bottom, effects a clamping connection between the wall of the longitudinal groove and the bottom part of the installation member.

In the structures described above, the Z-shaped bent clamping element is still relatively large. Assembly and disassembly are only possible if the box is empty. However, this simple structure is particularly in need of improvement because of the fact that the clamping element effects a connection only with one of the walls of the groove.

A structure in which the forces are transmitted over a large area and uniformly from the installation member to the walls of the groove is known from German Offenlegungsschrift No. 33 05 602. This structure is particularly adapted for the installation of electrical installation equipment which causes high mechanical forces to be generated during use, for example, high-voltage circuits, etc. However, in order to reach the desired goal, a substantial mechanical and structural expenditure is required.

It has been found that such a great expenditure is not always necessary while, on the other hand, the simple clamping device of the boxes described above is not sufficient, or results in certain electrical problems. Therefore, it is the object of the present invention to provide an installation member of the aforementioned type in which a distribution of the clamping forces is possible to both groove walls and which is of simple construction.

SUMMARY OF THE INVENTION

In accordance with the present invention, a control disk is rotatably mounted on the bottom part. Screw thread-type trip cams are formed in the outer side of the control disk. Two clamping levers are provided whose arms extend in opposite directions. The upper arms engage in one of the trip cams.

Thus, in the structure according to the invention, two relatively small, identically shaped clamping elements are used, wherein a clamping element each is provided on the right and on the left of the control disk, so that each clamping element effects the clamping connection with one of the groove walls. The fastening of the installation member in the service ducts is substantially simplified and accelerated because a quarter turn of the control disk is sufficient for effecting or releasing the clamping connection. Since the installation member is of a small size, it can be mounted in such a way that it is always accessible from the top, so that the device to be installed can also be adjusted after it is installed.

A further development of the invention provides that the upper arm is bent at its free end. This facilitates the release of the clamping connection by bringing the arm of the clamping lever located at the top side of the installation member in an upright position.

A further development of the invention provides that the control disk has a rib and the installation element has a detent which interacts with the rib and limits the angle of rotation and prevents damage to control disk and clamping lever even when operated incorrectly.

The conversion of the rotational movement of the control disk into the tilting movement of the clamping lever is facilitated and supported by a further development which provides that the trip cams are formed as grooves extending approximately parallel to the rotating shaft of the control disk and have a ramp which causes the clamping lever to assume an upright position. The same purpose is served by another feataure of the present invention which provides that a lateral border of the longitudinal slot in the bottom part is constructed as a sliding shoulder.

BRIEF DESCRIPTION OF THE DRAWING

The invention shall now be explained in more detail with the aid of an embodiment shown in the drawing. In the drawing.

DETAILED DESCRIPTION OF THE DRAWING

Figure 1:
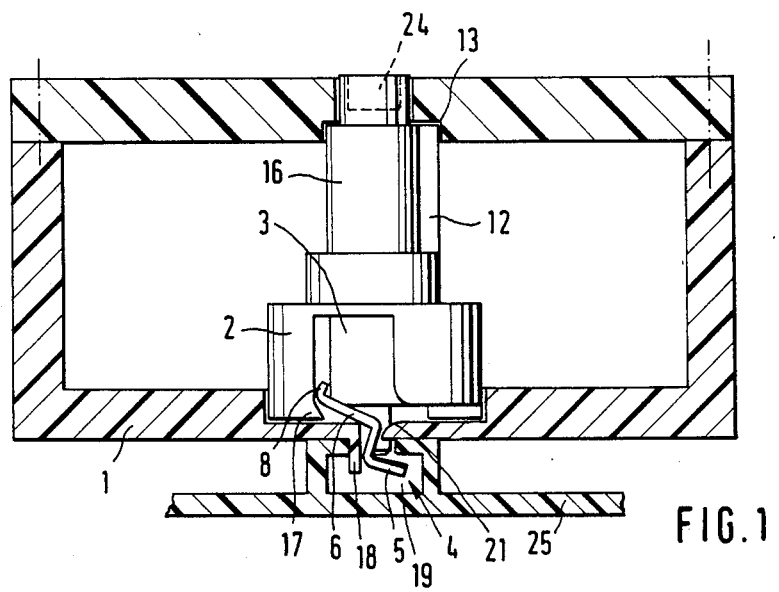
FIG. 1 is a cross-section of an installation member placed in a housing.

FIG. 1 shows in cross-section a housing 1 of an installation member which may be, for example, a device, a box to be installed or the like.

A control disk 2 is rotatably mounted in the housing 1. Control disk 2 has a rotating shaft 16. A rib 12 is formed on shaft 16. Rib 12 interacts with a detent 13 on the cover of housing 1 and limits the angle of rotation of the control disk. A slot 24 for screwdrivers is formed in the upper end face of shaft 16. Any thickness tolerances are compensated between bottom and cover of housing 1.

Two trip cams 3 are formed in the outer side of control disk 2. The trip cams 3 are comparable to a screw thread. These trip cams 3 are engaged by the upper arms 6 of two approximately Z-shaped bent clamping levers 4 which are arranged on the left and the right of control disk 2. The ends 8 of the arms 6 of the clamping levers 4 are bent upwardly and interact with a ramp 17 formed at the bottom of trip cam 3, so that the clamping levers are raised upwardly without tilting or clamping when control disk 2 is rotated.

The approximately Z-shaped bent clamping lever 4 is inserted in a longitudinal slot on the bottom side in such a way that the lower arms 5 is located on the outside of bottom part 1. Clamping lever 4 is tilted when control disk 2 is rotated counterclockwise. During this tilting movement, the middle portion of the lever 4 slides upwardly on a lateral border of the longitudinal slot formed as a shoulder 21 until the lower arm 5 is in a vertical position. In this position, arm 5 and an auxiliary web 18 formed on the bottom part 1 can be easily inserted into one of the T-shaped longitudinal grooves 19 on the rear wall 25 of the service duct.

Figure 2:
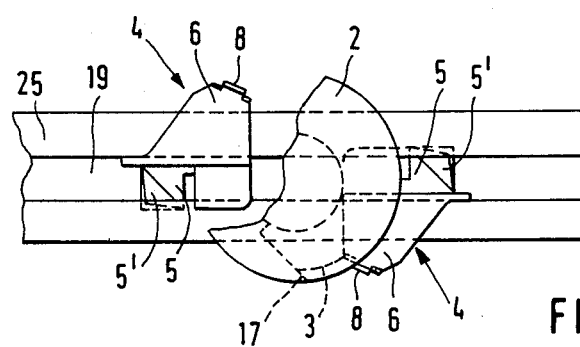
FIG. 2 is a top view of the bottom part of FIG. 1.

FIG. 2 shows a top view of the subject matter of FIG. 1, wherein all parts illustrated in FIG. 1 which impair clarity are omitted.

FIG. 2 particularly shows the two clamping levers with the upper arms 6 and the bent portions 8 with which each of the two clamping levers 4 engages in one of the trip cams 3 of control disk 2. Also shown is the lower arm 5 which is slotted for increasing the clamping action and is inclined at a corner 5'. In order to be able to discharge the clamping forces uniformly, the upper arm 6 of the clamping lever 4 is constructed as wide as possible.

As FIG. 2 shows, the two clamping levers 4 are arranged to the left and right of control cam 2. As a result of this mirror-type arrangement of clamping levers 4, the lower arms 5 engage underneath both walls of the T-shaped groove 19, so that the clamping and holding forces are uniformly distributed. If the forces are increased, the length of the clamping lever 4 can be increased or a plurality of the clamping devices are mounted on the insulation member.

We claim:

1. An installation member for a service duct, wherein the service duct has a rear wall, a longitudinal groove having an approximately T-shaped cross-section being provided on the rear wall of the duct, the longitudinal groove having walls, the installation member comprising an approximately rectangular bottom part with a central longitudinal slot, the bottom part having an upper side and a lower side, two approximately Z-shaped clamping members being placed in the central longitudinal slot; each of said levers having an upper arm and a lower arm, so that said upper arms of each said levers on the upper side of the bottom part is placed flat on this upper side and said lower arm of each said levers on the bottom side of the bottom part engages in the longitudinal groove and presses the installation member against the walls of the groove, a control disk having an outer side being rotatably mounted on the bottom part, screw thread-type trip cams being formed in the outer side of the control disk, wherein the arms of the two clamping levers extend in opposite directions, and wherein the upper arms engage in one of the trip cams.

2. Installation member according to claim 1, wherein each upper arm (6) has a bent free end (8).

3. Installation member according to claim 1, wherein the control disk (2) has a rib (12), and the installation member has a detent (13) which interacts with the rib (12) and limits the angle of rotation.

4. Installation member according to claim 1, wherein the control disk is under a rotating shaft (16) and the trip cams (3) are formed as grooves extending approximately parallel to the rotating shaft (16) of the control disk (2) and have a ramp (17) which causes the clamping lever (4) to assume an upright position.

5. Installation member according to claim 1, wherein a lateral border of the longitudinal slot in the bottom part (1) is constructed as a sliding shoulder (21).

* * * * *